US006697102B1

United States Patent
Olsson et al.

(10) Patent No.: US 6,697,102 B1
(45) Date of Patent: Feb. 24, 2004

(54) BORE HOLE CAMERA WITH IMPROVED FORWARD AND SIDE VIEW ILLUMINATION

(75) Inventors: Mark S. Olsson, La Jolla, CA (US); David A. Cox, San Diego, CA (US); Jeffrey A. Prsha, San Diego, CA (US); Michael E. Turgeon, San Diego, CA (US)

(73) Assignee: DeepSea Power & Light Company, San Diego, CA (US)

( * ) Notice: Subject to any disclaimer, the term of this patent is extended or adjusted under 35 U.S.C. 154(b) by 544 days.

(21) Appl. No.: 09/703,331

(22) Filed: Oct. 31, 2000

(51) Int. Cl.[7] .............................. H04N 7/18; H04N 9/47; G01V 3/00

(52) U.S. Cl. .......................... 348/85; 348/131; 324/323

(58) Field of Search ............................... 348/82–86, 31, 348/131; 73/152.01; 324/323

(56) References Cited

U.S. PATENT DOCUMENTS

| | | | | |
|---|---|---|---|---|
| 3,885,091 A | * | 5/1975 | Fish et al. ..................... | 348/84 |
| 4,855,820 A | | 8/1989 | Barbour ..................... | 358/100 |
| 5,519,543 A | | 5/1996 | Olsson et al. ................ | 359/894 |
| 5,652,617 A | | 7/1997 | Barbour ........................ | 348/85 |
| 5,717,455 A | * | 2/1998 | Kamewada ................... | 348/85 |
| 5,790,185 A | * | 8/1998 | Auzerais et al. .............. | 348/84 |
| 6,290,382 B1 | * | 9/2001 | Bourn et al. ................. | 362/554 |

* cited by examiner

Primary Examiner—Chris Kelley
Assistant Examiner—Dave Czekaj
(74) Attorney, Agent, or Firm—Michael H. Jester

(57) ABSTRACT

An elongate rugged cylindrical metal housing encloses rotatable forward looking and side looking video cameras for inspecting bore holes of water, oil and natural gas wells. A ring-shaped array of white LEDs is mounted on a PC board at the forward end of the housing. The ring-shaped array of LEDs surrounds, and is spaced rearward of a flat sapphire window through which the forward looking video camera views down the bore hole. The array of forward looking LEDs is encased behind a dome-shaped acrylic window which protects the forward looking LEDs from physical impacts and also functions as a light pipe. A side looking video camera is mounted in an inner tube rotatable by a motor drive within the outer housing about a longitudinal axis of the outer housing. The side field of view of the second video camera can be aligned with a predetermined circumferential region of a side wall of the bore hole for locating and inspecting defects in a well casing. A stationary cylindrical array of white LEDs is mounted in the exterior housing, surrounding the inner rotatable tube, slightly rearward of the second video camera. A light bending film with tiny Fresnel prisms is mounted just inside a cylindrical window of the housing and maximizes the amount of illumination that strikes the predetermined circumferential region. Switch mechanisms and circuitry are provided so that one or more sixty-degree circumferential segments of the cylindrical side facing array of LEDs which are adjacent the field of view of the side looking video camera are energized in order to minimize power consumption and heat dissipation. The forward and side illumination design minimizes the common illuminated volume and maximizes the resolution of the forward and side video images.

9 Claims, 3 Drawing Sheets

BORE HOLE CAMERA WITH IMPROVED FORWARD AND SIDE VIEW ILLUMINATION

BACKGROUND OF THE INVENTION

The present invention relates to apparatus for inspecting bore holes, and more particularly, to a video camera device adapted for inspecting a bore hole with improved forward and side view illumination.

There are many instances where holes are bored into the earth, such as water, oil and natural gas wells. It is often desirable to insert a video camera into a bore hole. This allows a geologist to inspect stratification, fracturing and layering of various geological formations through which the bore hole penetrates. In addition, a bore hole is often lined with a casing or pipe and it sometimes becomes necessary to inspect the integrity of this pipe for rust, cracks, rupturing, uncoupling and other defects. It is therefore desirable to be able to inspect a bore hole lined with casing or pipe with a video camera in order to ascertain the existence, nature and location of such bore hole defects.

Rugged video camera apparatus has been developed and used commercially for inspecting bore holes. Typically a cylindrical metal outer housing has separate forward looking and side looking video cameras mounted therein, the latter being rotatable. Gyroscopes, flux gate North direction seekers and inclinometers have been mounted in the cylindrical housing to provide an indication of the location and orientation of prior art bore hole cameras. Lights are usually connected to the forward end of the housing for illuminating the region of the bore hole ahead of the forward looking video camera and within the side of the cylindrical housing for illuminating the region of the sidewall of the bore hole adjacent the side looking video camera. Power, control signals and video image signals are transmitted between the bore hole camera and surface monitoring components via electrical conductors incorporated into the insertion and withdrawal cable coupled to the rear end of the cylindrical housing.

A bore hole is often filled with a light scattering medium, such as water. In order to optimize the resolution of the video image it is important to reduce the common illuminated volume between the video camera and the scene being viewed. Prior bore hole cameras have used forward shining incandescent lights such as that disclosed in U.S. Pat. No. 4,855,820 of Barbour. U.S. Pat. No. 5,652,617 of Barbour discloses a bore hole camera with a light source connected to its forward end for a forward looking video camera and a separate side facing light source for a separate side looking video camera. Since the side facing light source and the side looking camera must be axially spaced along the cylindrical outer housing, angled parabolic reflectors and forty-five degree angled mirrors adjacent the camera lens have been used in an attempt to project the maximum amount of light in the field of view of the side looking video camera and reduce the common illuminated volume. Incandescent light bulbs frequently fail, and much time is wasted in extracting the bore hole camera from the bore hole, replacing the bulb and reinserting the bore hole camera back to the desired location in the bore hole, which can be hundreds, or even thousands of feet from the surface. In addition, incandescent light bulbs often do not provide adequate illumination. If multiple bulbs were used, too much power would be consumed and/or excessive heat would be generated.

SUMMARY OF THE INVENTION

It is therefore the primary object of the present invention to provide a video camera device adapted for inspecting a bore hole with improved forward and side view illumination.

In accordance with the present invention, a bore hole camera has a housing configured for insertion into a bore hole and having a longitudinal axis. A first video camera is mounted in a forward end of the housing for generating video signals representing an image of a forward field of view extending in a forward direction from the housing. A forward illumination device is mounted in a forward end of the housing for illuminating the forward field of view. A second video camera is mounted in the housing for generating video signals representing an image of a side field of view extending in a side direction from the housing. Mechanisms are provided for rotating the second video camera around the longitudinal axis of the housing to align the side field of view of the second video camera with a predetermined circumferential region of a side wall of the bore hole. According to one aspect of our invention, a side illumination device is mounted in the housing adjacent the second video camera and includes a light bending component for maximizing the amount of illumination that strikes the predetermined circumferential region. According to another aspect of our invention the forward illumination device comprises an LED light ring set back from a forward end of the housing to minimize back scatter. According to another aspect of our invention the second video camera is mounted in a tube rotatable inside the housing about a common longitudinal axis. According to yet another aspect of our invention, the side illumination device comprises a cylindrical array of LEDs. Angular segments of the cylindrical array of LEDs are energized to illuminate the field of view of the second video camera and it rotates to thereby conserve power and reduce the amount of heat otherwise generated if all of the LEDs in the cylindrical array were simultaneously illuminated.

DESCRIPTION OF THE PREFERRED EMBODIMENT

Figure 1:
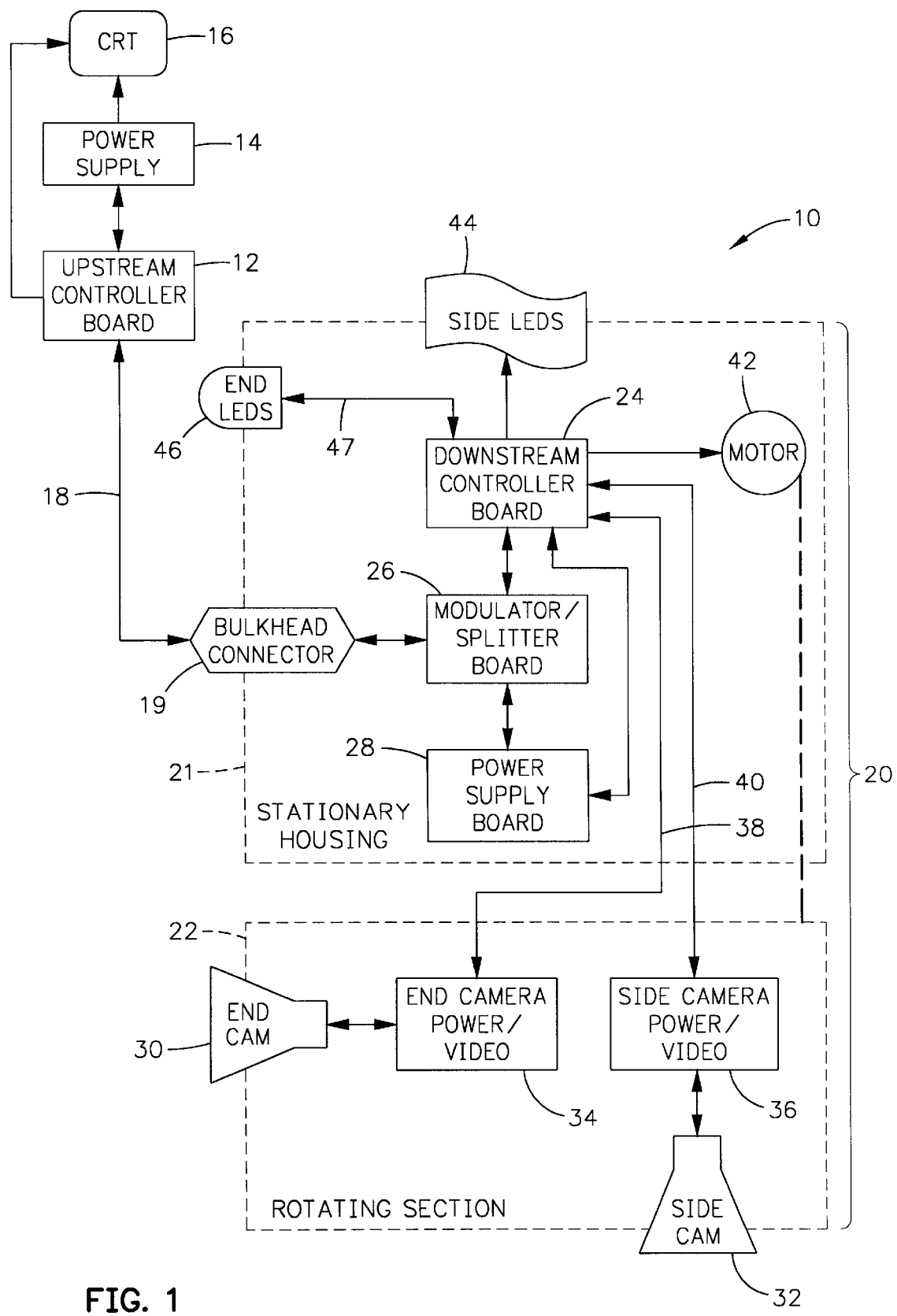
FIG. 1 is a functional block diagram of a bore hole video inspection system incorporating the bore hole camera of the present invention.

Referring to FIG. 1, a bore hole video inspection system 10 comprises top-side control components including of an upstream controller board 12 connected to a power supply 14 and a CRT 16. A cable 18, which may be raised and lowered with a winch (not illustrated), connects the upstream controller board 12 to a bulkhead connector 19 at the rear end of a bore hole camera 20 including a stationary cylindrical metal housing 21 and a rotating section 22 mounted inside the metal housing 21. The cable 18 is preferably a single, armored, co-axial cable that provides conductive paths for power, control and return video image signals, and also provides the mechanical member for raising and lowering the bore hole camera 20. The appropriate signal paths in the cable 18 are connected through the bulkhead connector 19 to a downstream controller board 24 through a modulator/splitter board 26 mounted inside the stationary housing 21. A power supply board 28 is also mounted inside the stationary housing 21 and is connected to the downstream controller board 24 and the modulator/splitter board 26.

The upstream controller board 12 injects a frequency shift key (FSK) signal at a frequency of approximately 4.5 KHz to 5.5 KHz onto the cable 18 to control the various functions inside the bore hole camera 20 including illumination, rotation, focus and so-forth. The power supply board 28 uses a DC to DC converter to transform the high voltage DC on the co-axial cable 18 to useful lower levels. A receiver on the modulator/splitter board 26 strips off the FSK signal and the downstream controller board 24 demodulates it. A microprocessor on the downstream controller board 24 receives the demodulated FSK signal and operates all the functions of a front end video camera 30 and a side view video camera 32. The video cameras 30 and 32 are connected through power/video circuits 34 and 36, respectively, and through slip ring couplings 38 and 40, respectively, to the downstream controller board 24. The output video signals from the video cameras 30 and 32 are modulated onto an FM carrier signal of approximately eight to twelve MHz via the modulator/splitter board 26 and sent over the co-axial cable 18 to the upstream controller board 12. The upstream controller board 12 demodulates and processes the video signals so that panoramic video images looking down the bore hole and looking at the side of the bore hole can be displayed on the CRT 16.

A motor 42 (FIG. 1) rotates the rotating section 22 of the bore hole camera 20 inside the stationary housing 21 three hundred and sixty degrees about a longitudinal central axis of the housing 21 (generally parallel with the bore hole axis). This allows the field of view of the side looking video camera 32 to sweep around the circumference of the side wall of the bore hole. The operator can command the side viewing camera 32 to move to a predetermined angular position for inspecting a particular defect in the side wall of the bore hole at its precise circumferential location. The mechanical driving link between the motor 42 and the rotating section 22 of the bore hole camera 20 inside the stationary housing 21 is illustrated by the heavy dashed line in FIG. 1.

In accordance with the present invention, the bore hole camera 20 is provided with improved forward and side view illumination means. The side view illumination means includes a cylindrical array of white LEDs 44 that surround a circumference of the stationary housing 21 intermediate its length and is connected to the downstream controller board 24. The forward view illumination means includes a ring-shaped array of white LEDs 46 that surrounds the forward end of the rotating section 22 of the stationary housing 21. The forward facing array of LEDs 46 is connected to the downstream controller board via slip ring coupling 47.

Figure 2:
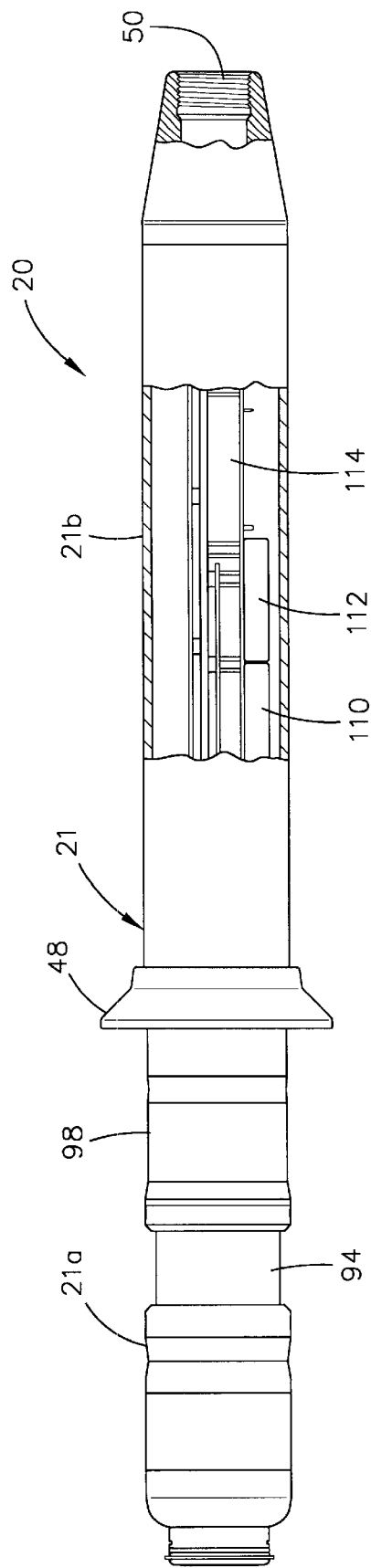
FIG. 2 is a longitudinal cross-sectional view of a preferred embodiment of the bore hole camera of the present invention.

Referring to FIG. 2, the bore hole camera 20 is preferably about one meter in length (longitudinal dimension) measured left to right in this drawing figure. The outer cylindrical housing 21 comprises a forward portion 21a and a rearward portion 21b. A forwardly angled reflector 48 surrounds the outer metal housing 21 at the junction of the forward and rear housing portions 21a and 21b for directing light from the side facing LEDs 44 in the forward direction (to the left in FIG. 2). The reflector is removable and is positionable along the longitudinal axis of the bore hole camera 20. The reflector 48 may be made of nickel with a coating of Rhodium on the forward facing surface thereof The Rhodium may be applied by electrolytic plating and provides excellent reflectivity. One or more spacers (not illustrated) may surround the housing 21 for centering the bore hole camera 20 in the bore hole to provide a minimum predetermined spacing between the side looking video camera 32 and the side wall of the bore hole. The bulkhead connector 19 is screwed into a female threaded hole 50 in the rear end of the outer housing 21.

Figure 3A:
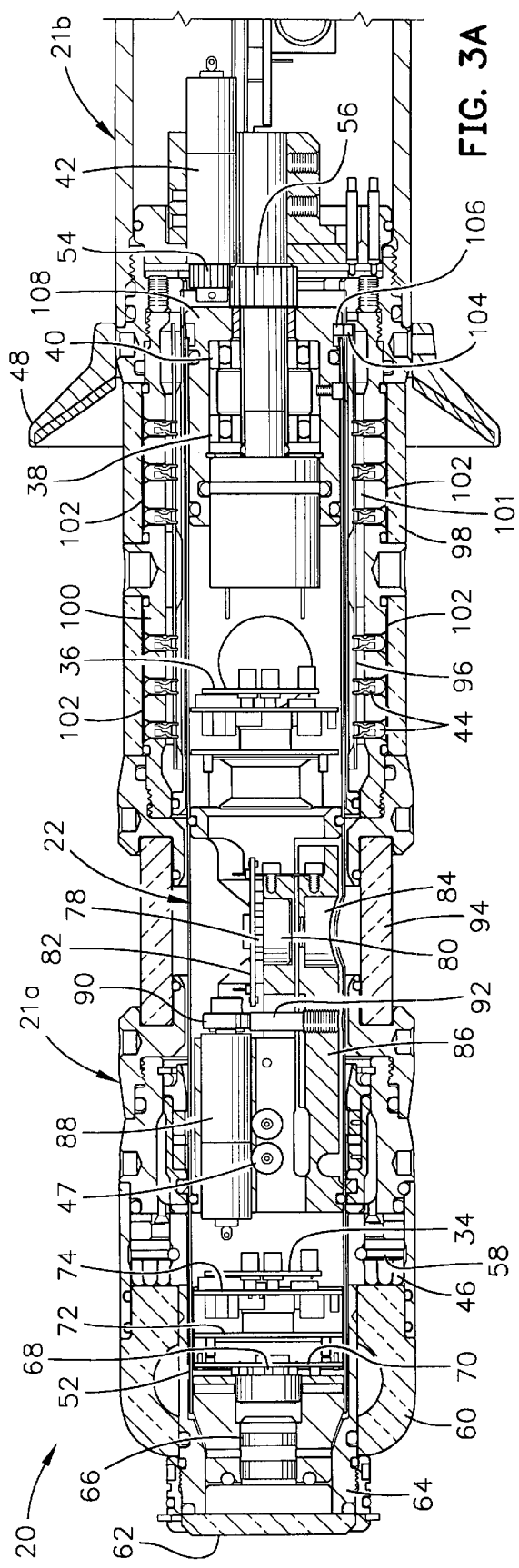
FIG. 3A is an enlarged cross-section of the forward half of the bore hole camera of FIG. 2.

Referring to FIG. 3A, the inner rotating section 22 of the bore hole camera 20 includes a smaller diameter metal tube 52 co-axially mounted for precision rotation within the forward portion 21a of the cylindrical outer housing 21. The inner section 22 is rotated by the motor 42 through a reduction drive including gears 54 and 56. One hundred and eight forward facing white LEDs 46 are mounted around a ring-shaped PC board 58 positioned between the tube 52 and the forward portion 21a of the outer housing 21 and extending perpendicular to the longitudinal axis of the bore hole camera 20. The forward facing LEDs 46 are encased behind a dome-shaped acrylic window 60 that protects the LEDs 46 and also functions as a light pipe. A scratch resistant sapphire viewing window 62 extends across the forward end of a stationary tubular chassis member 64 that receives the forward end of the tube 52. The sapphire forward viewing widow 62 is generally flat and disc-shaped. Light from the LEDs 46 that is reflected back from the bore hole is transmitted through the sapphire viewing window 62, through a lens 66 and a CCD 68 of the forward looking video camera 30. The ring-shaped array of LEDs 46 surrounds and is spaced rearwardly of the sapphire window 62 through which the forward looking end video camera 30 views down the bore hole. This minimizes the common illuminated volume and maximizes image resolution. The end video camera 30 includes circuitry mounted on several parallel transversely extending printed circuit boards 34, 70, 72 and 74.

The amount of set back or distance between the sapphire window 62 and the ring of forward illuminating LEDs 46 is preferably selected to shadow the volume of water in front of the window. In other words, the light from the LEDs 46 will not directly radiate over the volume of water directly in front of the sapphire window 62 due to the geometry of the light rays being shielded by the corner of the cylindrical assembly holding the window 62. This, coupled with the fact that light intensity reduces as the inverse square of the distance, helps to minimize undesirable back scatter to the front end video camera 30. That camera 30 is really designed to look considerably ahead of the bore hole camera 20. Preferably the set back distance is equal to or greater than the diameter of the window 62.

The side looking video camera 32 is mounted inside the tube 52 of the rotating section 22. The side looking video camera 32 includes a CCD 78 and a first stationary lens 80. The electronic circuitry of the video camera 32 is mounted on a longitudinally extending printed circuit board 82. A second movable lens 84 of the side looking video camera 32 is mounted in an aperture in a longitudinally extending lens plate 86. Focusing of the side looking video camera 32 is accomplished by moving the lens plate 86 back and forth in a transverse direction via energization of the motor 88. An eccentric 90 mounted on the shaft of the motor 88 moves a cam follower 92 whose outer end is connected to the lens plate 86 which is spring biased inwardly. A side view cylindrical glass window 94 couples forward and aft longitudinal segments of the forward portion 21a of the outer housing 21.

A total of three hundred and sixty side facing white LEDs 44 are mounted on multiple curved flexible printed circuit boards 96 to provide a cylindrical array between the tube 52 and the forward portion 21a of the outer housing 21. The side facing LEDs 44 are positioned behind a cylindrical acrylic tube 98 forming another side facing 360 degree cylindrical window in the outer housing 21. The LEDs 44 are mounted in sockets in a cylindrical mandrel 100 made of a Beryllium/Copper alloy. An Alumina filled polymer 101 is spread between the flexible printed circuit boards 96 and the mandrel 100 for improving heat dissipation.

The side looking video camera 32 views the side wall of the bore hole via lens 84 and window 94 which are positioned axially a significant distance from the cylindrical array of side facing LEDs 44. It is desirable to maximize the illumination on the portion of the bore hole side wall that is in the field of view of the side looking video camera 32. It is further desirable to minimize the common illuminated volume shared by the video camera 32 and the LEDs 44. Accordingly, the side view illumination means of the present invention incorporates light bending means in the form of a light turning film 102 that includes tiny Fresnel prism elements. These Fresnel prism elements comprise tiny cuts in a polycarbonate material that can bend the light forwardly from the LEDs 44 a predetermined angle, such as twenty degrees. The film 102 is rolled into a cylinder that is positioned between the Beryllium/Copper mandrel 100 and the acrylic tube 98. One suitable material for the film 102 is sold commercially under the designation number DTF/20DC 10-8 by Physical Optics, a company located in the United States of America. This light bending film maximizes the illumination of the portion of the side wall of the bore hole that is of interest. It also minimizes the common illuminated volume and maximizes the resolution of the side video image of the circumferential region of interest. This facilitates locating and inspecting sedimentation at particular locations in the bore hole or defects in a well casing at particular locations.

The large number of side facing LEDs 44 would consume substantial power if simultaneously energized. Therefore, it is desirable to only energize a fractional band or partial circumferential segment of the entire circumference of their cylindrical array so that the illuminated segment is adjacent the region of the wall of the bore hole being viewed by the side looking video camera 32. The remaining portion of the array of LEDs 44 can be kept in an OFF state until needed. One means for readily accomplishing this partial selective energization of a circumferential portion of the cylindrical array of LEDs 44 uses Hall effect switches such as 104 that are mounted at sixty-degree spaced locations on the flexible circuit boards 96. Magnets such as 106 are mounted on a tubular chassis member 108 mounted in the rear end of the tube 52 of the rotating section 22 of the bore hole camera 20. The magnets 106 are positioned in line with the viewing axis of the side looking video camera 32 so that as the tube 52 rotates, one or more of six equally sized circumferential segments (sixty degrees in arc) of the side looking cylindrical array of LEDs 44 is successively turned ON and OFF to illuminate that portion of the bore hole side wall in the field of view of the video camera 32. The front end video camera 30 rotates around the longitudinal axis of the outer housing 21 along with the side view video camera 32. The portion of the bore hole ahead of the bore hole camera 20 can be viewed either when the tube 52 is being rotated by the motor 42 or when the tube 52 is stationary.

Figure 3B:
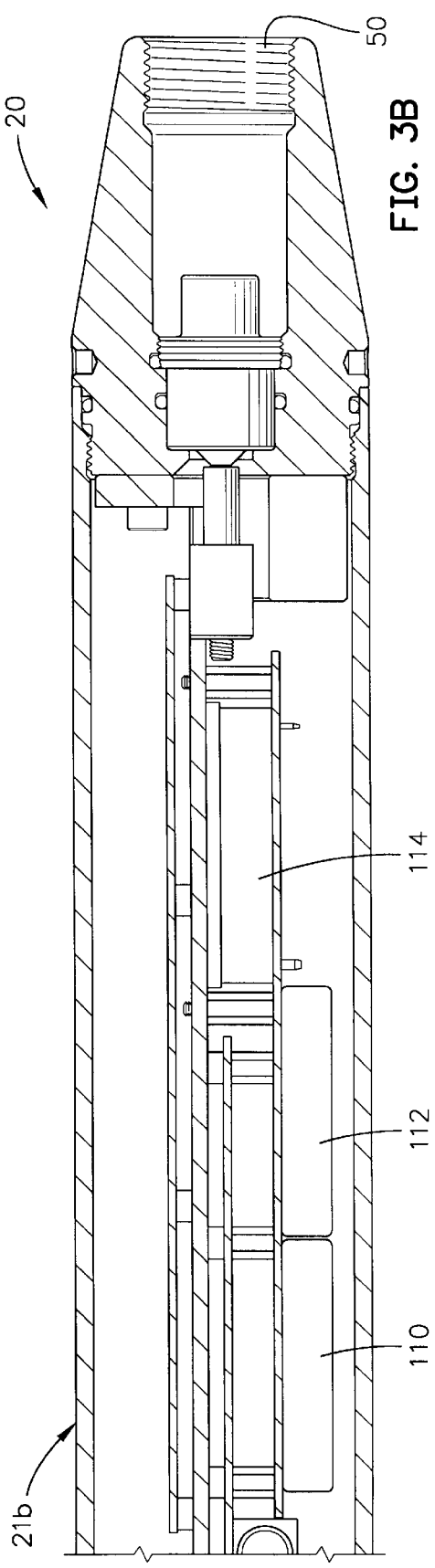
FIG. 3B is an enlarged cross-section of the rearward half of the bore hole camera of FIG. 2.

Referring to FIG. 3B, a gyroscope 110, flux gate North direction seeker 112 and inclinometer 114 are mounted in the rearward portion 21b of the cylindrical outer housing 21 to provide signals over the cable 18 indicative of the location and orientation of the bore hole camera 20 within the bore hole. The configuration and operation of such position sensing means are well known in the art of bore hole cameras and need not be described herein in further detail.

While a preferred embodiment of our bore hole camera 20 has been described and illustrated in detail, it will be apparent that modifications and adaptations thereof will occur to those skilled in the art. For example, either or both arrays 44 and 46 of LEDs could be provided with thermal feedback control to limit excessive power dissipation and heat generation, as set forth in pending U.S. patent application Ser. No. 09/506,181 filed Feb. 17, 2000 of Mark S. Olsson et al., entitled "Video Camera Head with Thermal Feedback Lighting Control," the entire disclosure of which is hereby incorporated by reference. Therefore, the protection afforded our invention should only be limited in accordance with the following claims.

We claim:

1. A bore hole camera comprising:

a generally elongate and cylindrical housing configured for insertion into a bore hole and having a longitudinal axis;

a first video camera mounted in a forward end of the housing for generating video signals representing an image of a forward field of view extending in a forward direction from the housing;

forward illumination means mounted in a forward end of the housing for illuminating the forward field of view;

a second video camera mounted in a tube rotatable within the housing behind a cylindrical window mounted in the housing for generating video signals representing an image of a side field of view extending in a side direction from the housing;

at least one slip ring coupling providing a conductive path between the rotatable tube and the housing;

means for rotating the second video camera around the longitudinal axis of the housing to align the side field of view of the second video camera with a predetermined circumferential region of a side wall of the bore hole; and side illumination means mounted in the housing adjacent the second video camera including light bending means for maximizing an amount of illumination that strikes the predetermined circumferential region.

2. The bore hole camera of claim 1 wherein the forward illumination means includes a ring-shaped array of LEDs.

3. The bore hole camera of claim 2 wherein the forward illumination means further includes a dome shaped window that protects the ring-shaped array of LEDs and also functions as a light pipe.

4. The bore hole camera of claim 1 wherein the side illumination means includes a cylindrical array of LEDs.

5. The bore hole camera of claim 1 wherein the side illumination means includes a cylindrical array of LEDs adjacent to a second cylindrical window.

6. The bore hole camera of claim 5 wherein the light bending means is a film underlying the second cylindrical window and having a plurality of Fresnel prism elements.

7. The bore hole camera of claim 4 wherein the side illumination means further includes means for only energizing one or more of a plurality of partial circumferential segments of the cylindrical array of LEDs that coincides with the field of view of the second video camera as the second video camera is rotated.

8. The bore hole camera of claim 4 and further comprising means for dissipating heat generated by the cylindrical array of LEDs.

9. A bore hole camera, comprising:

an elongate housing configured for insertion into a bore hole and having a longitudinal axis;

a tube rotatable within the housing;

a first video camera mounted in a forward end of the tube for generating video signals representing an image of a forward field of view extending in a forward direction from the housing;

forward illumination means mounted in a forward end of the housing for illuminating the forward field of view including a ring-shaped array of LEDs surrounding the tube and a dome shaped window that protects the ring-shaped array of LEDs and also functions as a light pipe;

a second video camera mounted in the tube for generating video signals representing an image of a side field of view extending in a side direction from the housing through a first cylindrical window mounted in the housing;

means for rotating the tube around the longitudinal axis of the housing to align the side field of view of the second video camera with a predetermined circumferential region of a side wall of the bore hole;

side illumination means mounted in the housing adjacent the second video camera for illuminating the predetermined circumferential region including a cylindrical array of LEDs mounted behind a second cylindrical window in the housing, light bending means for maximizing an amount of illumination that strikes the predetermined circumferential region means, means for dissipating heat generated by the cylindrical array of LEDs, and means for only energizing one of a plurality of partial circumferential segments of the cylindrical array of LEDs that coincides with the field of view of the second video camera as the second video camera is rotated; and means mounted in the housing for sensing a location and orientation of the housing within the bore hole and generating signals indicative thereof.

* * * * *